United States Patent
Kim et al.

(10) Patent No.: US 6,228,521 B1
(45) Date of Patent: May 8, 2001

(54) HIGH POWER DENSITY SOLID OXIDE FUEL CELL HAVING A GRADED ANODE

(75) Inventors: Jai-Woh Kim, Salt Lake City, UT (US); Kuan-Zong Fung, Tainan (TW); Anil V. Virkar, Salt Lake City, UT (US)

(73) Assignee: The University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 09/208,609

(22) Filed: Dec. 8, 1998

(51) Int. Cl.[7] ................................................. H01M 4/88
(52) U.S. Cl. ........................... 429/33; 429/45; 502/101
(58) Field of Search ............................. 429/33, 40, 45; 502/101

(56) References Cited

U.S. PATENT DOCUMENTS

| | | | |
|---|---|---|---|
| 4,554,225 | * 11/1985 | Sounai et al. | 424/45 X |
| 4,562,124 | 12/1985 | Ruka | 429/30 |
| 4,789,561 | 12/1988 | Schäefer et al. | 429/33 X |
| 4,851,303 | 7/1989 | Madou et al. | 429/33 X |
| 4,948,680 | 8/1990 | Madou et al. | 429/33 X |
| 5,035,962 | * 7/1991 | Jensen | 429/33 X |
| 5,108,850 | 4/1992 | Carlson et al. | 429/40 X |
| 5,151,334 | * 9/1992 | Fushimi et al. | 429/33 X |
| 5,350,641 | * 9/1994 | Mogensen et al. | 429/33 X |
| 5,453,330 | 9/1995 | Kawasaki et al. | 429/30 |
| 5,543,239 | * 8/1996 | Virkar et al. | 429/33 |
| 5,591,537 | * 1/1997 | Bagger | 429/33 |
| 5,720,864 | * 2/1998 | Nakagiri et al. | 429/33 X |
| 5,753,385 | * 5/1998 | Jankowski et al. | 429/45 X |
| 5,908,713 | * 6/1999 | Ruka et al. | 429/33 X |
| 6,048,636 | * 4/2000 | Naoumidis et al. | 429/40 X |

* cited by examiner

*Primary Examiner*—Stephen Kalafut
(74) *Attorney, Agent, or Firm*—Howard M. Peters

(57) ABSTRACT

The present invention concerns a high power density solid oxide fuel cell having a cathode, electrolyte and graded porous anode. The graded porosity of the anode allows easy transport of fuel gases thereby minimizing concentration polarization. Power densities of about 1.8 W/cm$^2$ at 800° C. and about 0.8 W/cm$^2$ at about 650° C. have been achieved with graded porous anodes as thick as 0.75 mm. These fuel cells having a graded porous anode are more durable and mechanically reliable than those found in the art.

20 Claims, 2 Drawing Sheets

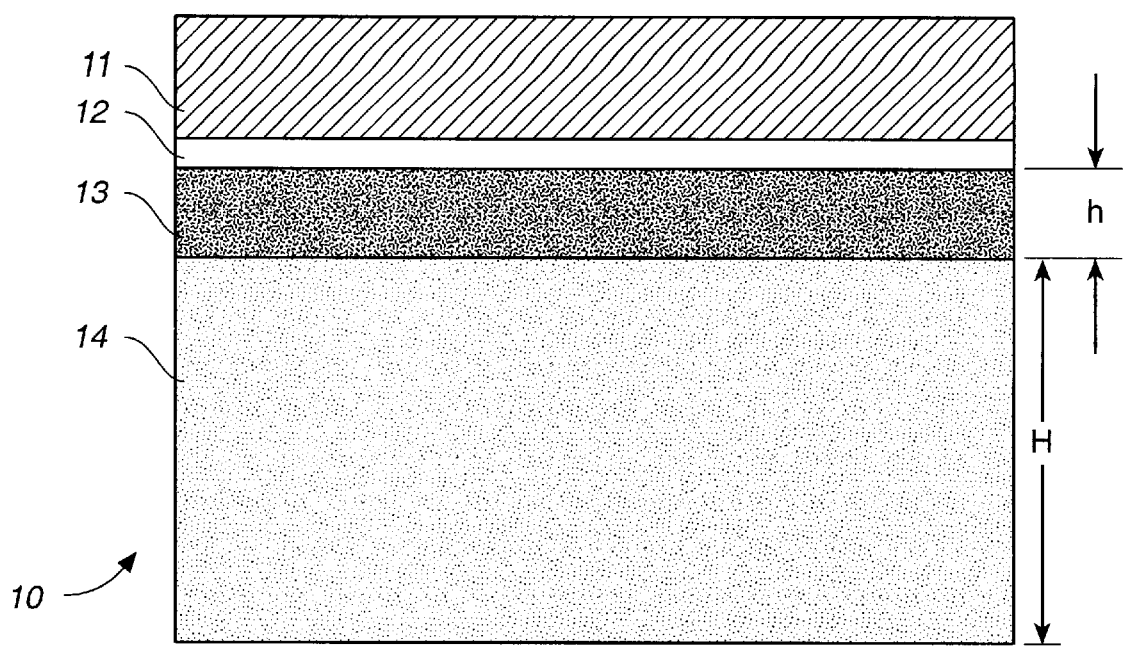
FIG._1
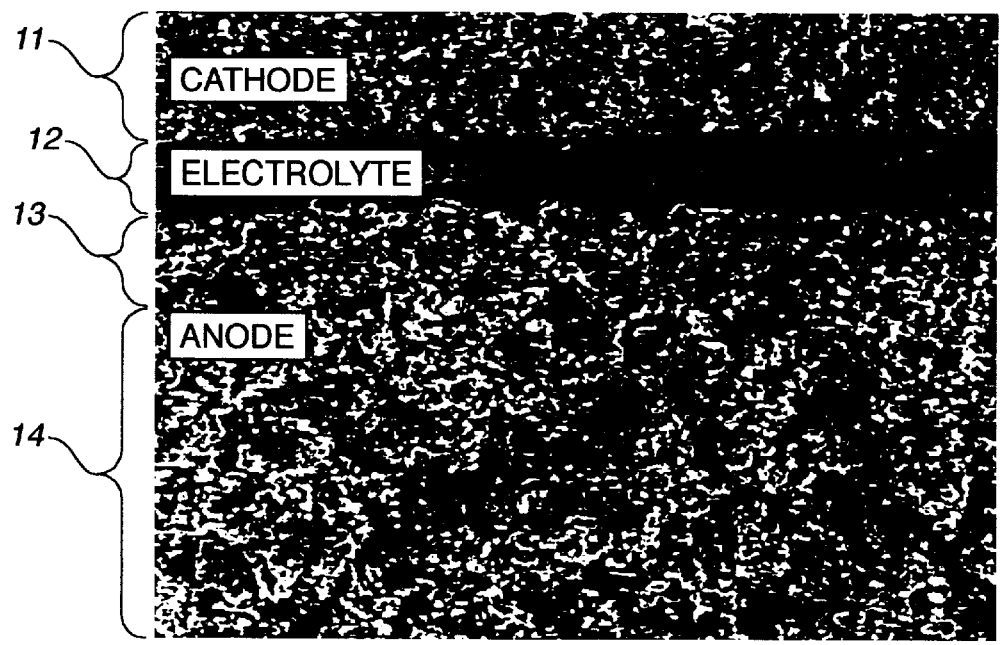
FIG._2

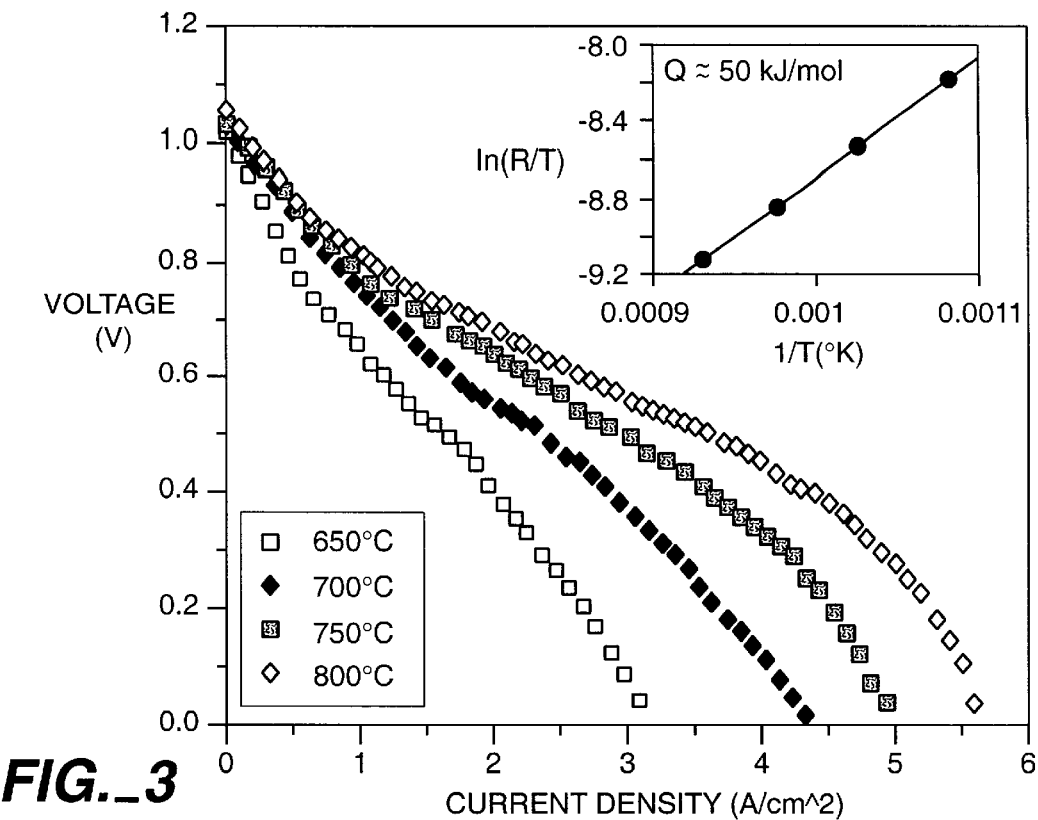
FIG._3
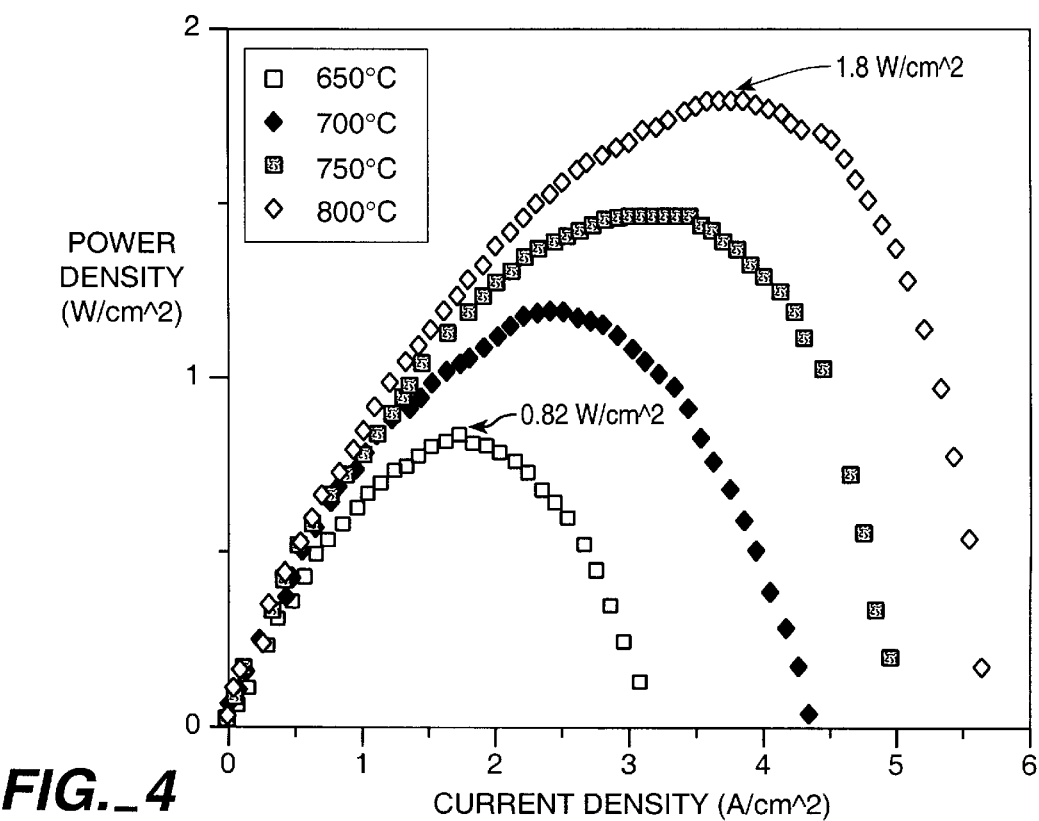
FIG._4

HIGH POWER DENSITY SOLID OXIDE FUEL CELL HAVING A GRADED ANODE

BACKGROUND OF THE INVENTION

1. Field of the Invention

The present invention relates to an improved high power density solid oxide fuel cell which uses graded density for the anode, while still incorporating a relatively thick anode. More specifically, an anode of nickel and YSZ (zirconium oxide doped with yttrium oxide) is fabricated such that a major layer initially has about 80 percent by volume of NiO and a minor layer initially has about 60 percent by volume of NiO. The region containing about 80 percent by volume has a greater porosity which allows for easier transport of reactive gases. The invention permits the use of thicker and thus stronger anodes without sacrificing electrochemical performance. This invention makes it possible to achieve a high power density and at the same time have a thick electrode for durability and mechanical reliability greater than is observed in the fuel cells of the art.

2. Description of Related Art

A goal of current fuel cell research and technology is to provide a high power density and at the same time provide for improved durability and mechanical reliability.

Some patents of interest are as follows:

B. S. Baker in U.S. Pat. No. 4,329,403 discloses an electrolyte-electrode assembly for a fuel cell. The electrolyte component is adapted to exhibit a gradual transition in the coefficient of thermal expansion going from the anode of the inner electrolytic region and in going from the cathode region to the inner electrolyte region.

A. C. Khandkar in U.S. Pat. No. 5,171,645 discloses a graded electrolyte of zirconia and bismuth oxide. The strength and reduction resistance of zirconia with the high ionic conductivity of bismuth oxide form a superior oxygen ion-conducting electrolyte which is especially useful in fuel cells.

A. V. Virkar, et al. in U.S. Pat. No. 5,543,239 disclose an improved electrode design by incorporation of a porous layer of electrolyte material over the dense electrolyte creating an enhanced three phase (TPB) length. This design allows for fuel cells to have improved performance at lower operating temperatures.

H. L. Tuller, et al. in U.S. Pat. No. 5,509,189 disclose an electrochemical device which includes a solid electrolyte and solid electrode composed of materials having different chemical compositions and characterized by different electrical properties but having the same crystalline phase.

None of these U. S. patents teach or suggest the present invention.

All articles, patents, applications, references, standards and the like cited herein are incorporated by reference in their entirety.

It is desirable to have a high power density solid oxide fuel cell which has superior power densities and at the same time are more durable and mechanically reliable. The present invention provides such an improved fuel cell.

SUMMARY OF THE INVENTION

In one aspect, the present invention relates to an improved method to produce a high power density solid oxide fuel cell having a graded anode, which method comprises:

(a) obtaining a powder mixture of nickel oxide and YSZ, said YSZ having a composition of between about 5 and 15 mole percent of $Y_2O_3$ doped $ZrO_2$, wherein the ratio of nickel oxide to YSZ is between about 70 to 90 volume percent of the total volume of powder;

(b) creating a pellet of the mixture of step (a) by consolidation, including but not limited to die pressing at a pressure between about 20 and 300 MPa at ambient temperature;

(c) producing a powder mixture of nickel oxide and YSZ, said powder mixture having between about 50 and 65 volume percent of nickel oxide to the total mixture;

(d) producing a slurry of the powder mixture of step (c) with water, a C1 to C4 alcohol, a volatile chlorinated hydrocarbon, or mixtures thereof in a weight to volume ratio corresponding to between about 0.5 to 3 g of powder mixture to between about 30–50 ml of alcohol, optionally subjecting the obtained slurry to ultrasonic mixing;

(e) contacting the pellet of step (b) with the slurry of step (d) followed by evaporation of the alcohol wherein the coated pellet is isostatically pressed at between about 150 and 250 MPa and ambient temperature to produce a graded pellet;

(f) depositing a layer of YSZ on the surface of the graded pellet of step (e);

(g) sintering the pellet of step (f) in air at between about 1100 and 1600° C. for between about 0.5 and 3 hr producing densification of the pellet in three layers, said layers comprising YSZ electrolyte, NiO plus YSZ inner anode layer and NiO plus YSZ outer anode and support, wherein said YSZ electrolyte layer has porosity of less than 4% by volume, said NiO plus YSZ inner anode layer has a porosity of less than about 10% by volume, and said NiO plus YSZ outer anode layer and support has a porosity of less than about 10% by volume;

(h) obtaining a powdered LSM by calcining a three component mixture, e.g. $MnO_2$, $La_2O_3$, and $SrCO_3$, at between about 800 and 1200° C. for between about 6 to 10 hr;

(i) obtaining and calcining a powdered YSZ at between 1000 and 1300° C. for between about 0.5 and 5 hr;

(j) producing a powder mixture of 50 weight percent LSM and 50 weight percent YSZ which is contacted with an organic liquid having a boiling point of less than 200° C. to produce a paste;

(k) successively coating the pellet of step (g) with the paste of step (j) followed by heating at between about 350 and 500° C. for between about 0.5 and 5 hr to produce a layer of between about 40 and 100 micrometers in thickness;

(l) heating the coated pellet of step (k) at between about 1000 and 1400° C. for between about 0.5 hr and 5 hr to create the unreduced fuel cell;

(m) contacting the unreduced fuel cell of step (l) at between about 500° C. and 1000° C. with a mixture of water vapor and hydrogen in a ratio of between 1% and 10% volume percent water vapor for between about 0.5 and 5 hr; and (n) producing a reduced fuel cell wherein the thicker anode of about 70 to 90 volume percent nickel oxide has an open porosity of between about 30 and 40 volume percent, and the thinner anode of about 50 and 65 volume percent of nickel oxide has a porosity of between about 20 to 29.9 volume percent.

The consolidation of the powder to create the pellet in step (b) may occur by die-pressing tape casting, slip-casting, electrophoretic deposition, injection-moldy and the like.

In another aspect, the present invention relates to the method wherein in step (a), nickel oxide is present in about 80 volume percent;

in step (b), the pressure is between about 50 and 100 MPa;

in step (c), the nickel oxide is about 60 volume present;

in step (d), the alcohol is ethanol or methanol;

in step (e), the isostatic pressure is between about 175 and 225 MPa;

in step (g), the sintering is performed at between about 1200 and 1500° C. for about 1 hr;

in step (h), the temperature is between about 900 and 1100° C. for about 8 hrs;

in step (i), the temperature is maintained about 1200° C. for about 1 hr;

in step (k), the temperature is between about 400 and 450° C.;

in step (l), the temperature is between about 1100 and 1300° C. and the time is about 1 hr; and in step (m), the temperature is between about 600 and 900° C.

In another aspect, the present invention relates to the method wherein in step (a), nickel oxide is present in about 80 volume percent;

in step (b), the pressure is about 60 MPa;

in step (c), the nickel oxide is about 60 volume present;

in step (d), the alcohol is ethanol;

in step (e), the isostatic pressure is about 200 MPa;

in step (g), the sintering is performed at between about 1400° C. for about 1 hr;

in step (h), the temperature is about 1000° C. for about 8 hrs;

in step (i), the temperature is maintained about 1200° C. for about 1 hr;

in step (k), the temperature is about 400° C.;

in step (l), the temperature is about 1250° C. and the time is about 1 hr; and in step (m), the temperature is between about 650 and 900° C.

In another embodiment of the present invention is an improved fuel cell wherein the anode when reduced in water vapor and hydrogen has a graded porosity, wherein one layer adjacent to the electrolyte has a porosity of between about 20 and 30 and a thickness of between about 5 and 50 $\mu$m, and the other outer layer has a porosity of between about 30 and 40 and a thickness of between about 100 and 3000 $\mu$m.

In another embodiment of the present invention the inner layer has a porosity of between about 10 and 40% and a thickness of between about 5 and 100 $\mu$m, and the outer layer has a porosity of between about 20 and 50% and a thickness of between about 100 and 3000 $\mu$m.

BRIEF DESCRIPTION OF THE FIGURES

FIG. 1 is a schematic representation of a cross-section of the improved fuel cell showing cathode, electrolyte and graded anode.

FIG. 2 is a drawing representation of a scanning electron micrograph of the cross section of the fuel cell having a graded anode.

FIG. 3 is a graphic representation of the voltage versus the current density of the graded anode cell at various temperatures.

FIG. 4 is a graphic representation of the power density versus current density of the graded anode cell at various temperatures.

DETAILED DESCRIPTION OF THE INVENTION AND PREFERRED EMBODIMENT

Definitions

As used herein:

"C1 to C4 alcohol" refers to methanol, ethanol, isopropanol, n-propanol, n-butanol, isobutanol, sec-butanol, tert-butanol and combinations thereof. Ethanol is preferred.

"Organic liquid having a boiling point of 200° C. or less at ambient pressure" refers to any common liquid which evaporates without a residue. Organic liquids include for example, alcohols, ethers, ketones, esters, chlorinated hydrocarbons and combinations thereof. Ethylene glycol is preferred.

"LSM" refers to a three component oxides in the present invention, wherein $MnO_2$ is the first component (M); $La_2O_3$, $Y_2O_3$, any rare earth element oxide or combinations thereof as a second component (L): and $SrCO_3$, $CaCO_3$, $BaCO_3$, $MgCO_3$ or combinations thereof as the thirds component (S). The ratios of the first, second and third components is 30 to 40 weight percent/40 to 60 weight percent/10 to 15 weight percent, respectively. In a specific embodiment LSM refers to the oxide obtained when 35.23 percent by weight $MnO_2$, 52.81 percent by weight $La_2O_3$ and 11.96 percent by weight of $SrCO_3$ are annealed as described herein.

"Rare earth metal oxide" refers to an oxide of one of a group of 15 chemically related elements in Group III B of the conventional Periodic Table. They are also known or the lanthanides series, and include lanthanum, cerium, praseodymium, neodymium, promethium, samarium, europium, gadolinium, terbium, dysprosium, holmium, erbium, thulium, ytterbium, and lutetium.

From a practical standpoint, one of the components comprising a cell, e.g. cathode, electrolyte, or anode, should be thick enough to be the support structure. The use of anode as the support structure is most beneficial from the standpoint of performance as well as for processing. Using anodes of thickness on the order of 0.7 to 1.0 mm, it is possible to produce fuel cells having power densities as high as about 1.8 W/cm² at 800° C. These cells are quite rugged. Power densities only slightly higher than this value have been reported, however, only by using cells that are very thin, typically less than 0.2 mm (200 micrometer). See S. de Souza, S. J. Visco and L. C. De Jonghe, *Journal of the Electrochemical Society*, Vol. 144, #5, L35 (1977).

Such prior art fuel cells are very fragile and impractical for most applications. In the present invention, it is possible to increase power density without lowering the thickness of the anode. Results show that by using a composite electrode, it is possible to reduce activation overpotential to a very low value. Under such conditions, concentration polarization becomes rate limiting. Activation overpotential refers to voltage losses due to electrochemical charge transfer reactions. Concentration polarization refers to voltage losses associated with resistance to gas flow through porous electrodes.

Thus, in order to enhance cell performance without reducing the anode thickness, it is imperative that the porosity of the anode be increased. This porosity is achieved by increasing the NiO content and reducing the YSZ content. However, at the electrolyte/anode interface, it is desirable to have as much YSZ as possible to minimize activation polarization.

The present invention is based on and is an improvement of patented electrode design described in U.S. Pat. No.

5,543,239. Thus, the best way to achieve both objectives is to use a graded anode design such that in the proximity of the electrolyte/anode interface, the amount of YSZ is large enough to optimize performance. At the same time at distances away from the interface, it is better to have more NiO and less YSZ. In this manner, upon reduction of NiO to Ni, greater porosity is formed to allow for easier transport of gaseous species. At the same time, there is sufficient thickness of the anode with a significant YSZ concentration near the electrolyte to lower the charge transfer resistance or the activation overpotential at the anode.

A schematic representation of the cross section of fuel cell having a graded anode is shown in FIG. 1. The fuel cell 10 as shown has a number of layers. The cathode 11 is at the top of the cell in contact with electrolyte 12. The electrolyte 12 contacts the cathode 11 on one side and the inner layer 13 of the graded anode on the other side which has a higher YSZ content and lower porosity. In the inner layer of the graded anode layer 13, electrolyte charge transfer, gas transport and electronic conduction occur. Outer layer 14 of graded anode has a lower YSZ content and higher porosity than in anode layer 13. It is in this region that the predominant functions are gas transport and electronic conduction. Anode layer 14 having a thickness H is usually much thicker than anode layer (having a thickness h), e.g., anode layer 14 is about 3 to 30 times thicker than anode layer 13.

The following description concerns the steps identified in the Summary of the Invention (supra):

Step (a)—Nickel oxide is obtained from Alfa Aesar. $Y_2O_3$-doped $ZrO_2$ (YSZ) containing 8 mol % $Y_2O_3$ is obtained from Tosoh. The components are mixed in a ratio 80 to 90 vol. % NiO, balance YSZ by using a ball mill for 24 hrs.

Step (b)—The powders of step (a) are pressed in a conventional uniaxial press, e.g., carrier in a steel die at between about 30 to 300 megapascals (MPa) for between about 1 and 10 min. at ambient temperature. Preferably the pressing is between about 50 and 300 MPa, more preferably between about 50 and 200 MPa, most preferably between about 50 to 150 MPa and especially about 60 MPa.

Step (c)—Combining and mixing nickel oxide and YSZ as described above in step (a) with the modification that the nickel oxide is present in between about 50 to 65 percent by volume, preferably between about 55 to 62 percent by volume, and more preferably about 60 percent by volume.

Step (d)—Combining the powders of step (c) with an alcohol on a weight to volume basis of between about 0.1 to 10 g per 100 ml alcohol with conventional mechanical agitator for between about 0.2 and 2 hr. Optionally the slurry is subjected to conventional ultrasonic mixing for between about 0.2 and 2 hr. Other organic liquids may be used. Even water and mixtures thereof are possible.

Step (e)—Contacting one surface of the pellet obtained in Step (b) with the slurry of step (d) followed by evaporation of the alcohol to produce a coated pellet. The pellet is then isostatically pressed at between 150 and 250 MPa for between about 0.1 and 10 min. at ambient temperature to produce a graded pellet.

Step (f)—A layer of YSZ is deposited (as produced above) on the coated surface of the graded pellet of step (e).

Step (g)—Heating (sintering) the pellet of step (f) in air at between about 1100 and 1500° C. (preferably between about 1300 and 1500° C., more preferably about 1400° C.) for between about 0.5 and 3 hr. (preferably between about 0.5 and 2 hr), more preferably between about 0.5 and 1.5 hr) producing a graded densified cell (pellet) having three layers.

Sintering means densifying or reduction in porosity. No separate calcination step for YSZ is needed at this step.

Step (h)—Preparing a powdered LSM by calcining $MnO_2$ (35.23% by weight), $La_2O_3$ (52.81% by weight) and $SrCO_3$ (11.96% by weight) at between about 800 and 1200° C. (preferably about 1000° C.), preferably for between about 6 and 10 hr (more preferably between about 7 and 9 hr, and most preferably about 8 hr). The oxides and carbonates react to form LSM. As is described herein the L component ($La_2O_3$) e.g. is replaced by $Y_2O_3$ or any other rare earth metal oxide and combinations thereof and similar results are obtained. Also, as is described herein, the S component (e.g. $SrCO_3$) is replaced by $BaCO_3$, $CaCO_3$, $MgCO_3$ or combinations thereof, and similar results are obtained.

Step (i)—Obtaining and calcining in air a powdered YSZ at between about 1000 and 1300° C. (preferably between about 1100 and 1200° C.), for between about 0.5 and 5 hr (preferably between about 0.5 and 2 hr, and most preferably about 1 hr).

Step (j)—Combining 50 weight percent of LSM of step (h) with 50 weight percent of YSZ of step (i), mixing and combining with an organic liquid (as defined hereinabove) to produce a paste. Preferably the organic liquid is ethylene glycol.

Step (k)—Coating at least once the coated side of the pellet of step (g) with the paste of step (j) followed by successive coating and heating at between about 350 to 500° C. for between about 0.5 and 5 hr to produce a layer which is between about 40 and 100 micrometers in thickness.

Step (l)—Heating the coated pellet of step (k) in air at between about 1000 and 1400° C. (preferably between about 1100 and 1300° C., and more preferably about 1250° C.) for between about 0.5 and 5 hr to create the unreduced fuel cell having a graded anode.

Step (m)—Contacting the cell of step (l) at between about 500° C. and 1000° C. with a 1 to 10 volume percent of water vapor in hydrogen for between about 0.5 and 5 hr (preferably between about 1 and 3 hr, and more preferably about 2 hr), to produce a reduced active fuel cell wherein the thicker anode of between about 70 to 90% initial nickel oxide has an open porosity of between about 30 and 40 volume percent and the thinner anode of between about 50 and 65 volume percent initial NiO has a porosity of between about 20 and 29.9 volume percent. After reduction, the anode/cathode/electrode is Ni+YSZ (porous)/YSZ (dense)/LSM+YSZ (porous).

The following examples are presented for the purposes of description and illustration. They are not to be considered to be limiting in any way.

EXAMPLE 1

GRADED ANODE OF NiO AND YSZ (a) A powder mixture of NiO+YSZ (8 mol. % $Y_2O_3$-doped $ZrO_2$) containing 80 vol. % NiO and 20 vol. % YSZ was produced. Pellets of this material were green-formed by die-pressing at 60 MPa for 2 minutes. Subsequently, a power mixture containing 60 vol. % NiO and 40 vol. % YSZ was prepared. A slurry of the composition having the weight/volume ratio of 1 g of the power mixture to 40 ml. of ethanol was prepared. The slurry was treated in an ultrasonic bath for 30 min to mix the components. The pellets were drop-coated using this slurry. After drying, the pellets were isostatically pressed at 200 MPa at ambient temperature. Subsequently, a layer of YSZ was deposited on the surface of the bi-layer anode, also by slurry drop-coating. The entire pellet was sintered in air at 1400° C. for 1 hr. This sintering caused densification of the pellet containing three layers: 1) YSZ electrolyte, 2) NiO+YSZ inner anode layer, and 3) NiO+YSZ outer anode (support). All three layers sintered to have the stage of closed porosity. The YSZ layer had negligible porosity. The NiO+YSZ layers may have had a few percent porosity.

Sr-doped LaMnO$_3$(LSM) was used as the cathode. LSM (La$_{0.8}$Sr$_{0.2}$MnO$_{(3-\delta)}$) was made by calcining a mixture of MnO$_2$, La$_2$O$_3$, and SrCO$_3$ at 1000° C. for 8 hr. YSZ powder was also calcined at 1200° C. for 1 hr. A powder mixture containing 50 percent by weight LSM and 50 percent by weight YSZ was made. A paste containing 5 g of the powder mixture in an organic liquid was made. The pellet was coated with this paste and heated to 400° C. The procedure of coating and heating to 400° C. was repeated until a thickness of 50 to 70 micrometer was achieved. The discs were then heated to 1250° C. for 1 hr. This heating completed the fabrication of the cell. Reduction of NiO to Ni was accomplished in the fuel cell test described in Example 2. Reduction was complete before Example 2 test. However, it is possible to effect reduction of NiO to Ni during the test of Example 2.

In the thicker anode region containing 80 percent by volume NiO, the expected open porosity upon reduction of NiO to Ni is about 32.9 vol. % (based on specific volumes of Ni and NiO) and in the thin anode region containing 60 percent by volume NiO, the expected porosity is about 24.7 percent by volume. About 100% conversion of NiO occurred. The actual porosity is expected to be higher in both regions of the anode since the initial NiO+YSZ sintered samples contained some porosity. This type of porous structure thus allows easy transport of gases through the support part of the anode, while at the same time allowing for easier charge transfer process in the low Ni content (high YSZ content) region. FIG. 2 shows a scanning electron micrograph (SEM) of the cross section of the graded fuel cell. The regions compare with those of FIG. 1 and FIG. 2. In FIG. 2, only a part of the higher porosity region of the anode is seen in this specific micrograph. The thickness of region 14 or (region H) is about 750 micrometers. FIG. 3 is a graphic representation of voltage versus current density of a graded electrode single cell at various temperatures. FIG. 4 is a graphic representation of power density versus current density on a graded anode single cell at various temperatures.

For FIGS. 3 and 4 the maximum power densities at 650 and 800° C. measured were about 0.82 and 1.8 W/cm$^2$ respectively using humidified hydrogen as the fuel and air as the oxidant. The cell dimensions were as follows: cathode thickness is about 50 micrometer, electrolyte thickness is about 10 micrometer, and the anode thickness is about 750 micrometer. The inset in FIG. 3 shows the cell resistance as a function of temperature. The corresponding activation energy, Q was determined to be about 50 k./mol.

(b) Similarly, the reactions in Example 1(a) are repeated except that the La$_2$O$_3$ is replaced with a stoichiometrically equivalent amount of Y$_2$O$_3$. Similar results are obtained.

(c) Similarly, the reactions in Example 1(a) are repeated except that the La$_2$O$_3$ is replaced with a stoichiometrically equivalent amount of a rare earth oxide cerium. Similar results are obtained.

(d) Similarly, the reactions in Example 1(a) are repeated except that the SrCO$_3$ is replaced with a stoichiometrically equivalent amount of BaCO$_3$. Similar results are obtained.

(e) Similarly, the reactions in Example 1(a) are repeated except that the SrCO$_3$ is replaced with a stoichiometrically equivalent amount of CaCO$_3$. Similar results are obtained.

(f) Similarly, the reactions in Example 1(a) are repeated except that the SrCO$_3$ is replaced with a stoichiometrically equivalent amount of MgCO$_3$. Similar results are obtained.

(g) Similarly, the reactions in Example 1(b) are repeated except that the SrCO$_3$ is replaced with a stoichiometrically equivalent amount of BaCO$_3$. Similar results are obtained.

(h) Similarly, the reactions in Example 1(b) are repeated except that the SrCO$_3$ is replaced with a stoichiometrically equivalent amount of CaCO$_3$. Similar results are obtained.

(i)) Similarly, the reactions in Example 1(b) are repeated except that the SrCO$_3$ is replaced with a stoichiometrically equivalent amount of MgCO$_3$. Similar results are obtained.

EXAMPLE 2

FUEL CELL TESTING

Fuel cell testing was conducted over a range of temperatures between 650 and 800° C. with humidified hydrogen as the fuel and air as the oxidant. FIG. 3 is a graph which corresponds to voltage versus current density, and FIG. 4 is a graph which compares power density versus current density. The dimensions of this particular cell were as follows: Electrolyte thickness is about 10 micrometer, cathode thickness is about 50 micrometer, total anode thickness is about 750 micrometer (0.75 mm) of which the low porosity region is about 15 micrometer. Note that power densities as high as about 1.8 W/cm$^2$ at 800° C. and about 0.8 W/cm$^2$ at 650° C. were measured with an anode thickness of about 750 micrometer. This enhanced performance is thus obtained using cells having a graded anode which are quite rugged and resistant to mechanical and electrical stress.

While only a few embodiments of the invention have been shown and described herein, it will become apparent to those skilled in the art that various modifications and changes can be made in the improved method to produce a fuel cell having a graded anode and the fuel cell thereof which has high power density and is more durable and mechanically reliable than those of the art without departing from the spirit and scope of the present invention. All such modifications and changes coming within the scope of the appended claims are intended to be carried out thereby.

We claim:

1. A method to produce an improved high power density solid oxide fuel cell having a graded anode, which method comprises:

(a) obtaining a powder mixture of nickel oxide and YSZ, said YSZ having a composition of between about 5 and 15 mole percent of Y$_2$O$_3$ doped ZrO$_2$, wherein the ratio of nickel oxide to YSZ is between about 70 to 90 volume percent of the total volume;

(b) creating a pellet of thickness of between about 100 and 3000 μm by consolidation of the powder mixture of step (a);

(c) forming a powder mixture of nickel oxide and YSZ, said powder mixture having between about 50 and 65 volume percent of nickel oxide to the total mixture;

(d) forming a slurry of the powder mixture of step (c) with water, a volatile organic liquid or mixtures thereof optionally subjecting the obtained slurry to mixing;

(e) contacting the pellet of step (b) with the slurry of step (d) followed by evaporation of the volatile liquid only when it is present to produce a graded pellet;

(f) depositing a layer of YSZ on the top surface of the graded pellet of step (e);

(g) sintering the pellet of step (f) in air at between about 1100 and 1500° C. producing densification of the pellet in three layers, said layers comprising YSZ electrolyte, NiO plus YSZ inner electrode layer and NiO plus YSZ outer anode and support, wherein said YSZ electrolyte layer has porosity of less than 4% by volume, (h) obtaining a powdered mixture LSM by calcining a mixture of at least three components having $MnO_2$ as a first component; a second component selected from the group consisting of $La_2O_3$, $Y_2O_3$, any other rare earth element oxide, or combinations thereof; and a third component selected from the group consisting of $SrCO_3$, $CaCO_3$, $BaCO_3$, $MgCO_3$ or combinations thereof at between about 800 and 1200° C.;

(i) obtaining and calcining a powdered YSZ at between 1000 and 1300° C.;

(j) producing a powder mixture of LSM and YSZ which is mixed with a organic liquid;

(k) successively coating the top of the pellet of step (g) with the mixture of step (j) followed by heating at between about 350 and 500° C. in air or oxygen to produce a layer of between about 5 and 100 micrometers in thickness;

(l) heating the coated pellet produced in step (k) at between about 1000 and 1400° C. to create the unreduced fuel cell; and (m) contacting the unreduced fuel cell of step (l) at between about 500° C. and 1000° C. with a mixture of water and hydrogen; thereby producing a reduced fuel cell wherein the thicker anode which has an open porosity of between about 30 and 40 volume percent, and the thinner anode which has a porosity of between about 20 to 29.9 volume percent.

2. The improved method of claim 1 wherein in step (a), nickel oxide is present in about 80 volume percent;

in step (b), the pressing is about 60 MPa, the thickness is about 1 mm;

in step (c), the nickel oxide is about 60 volume present;

in step (d), the alcohol is ethanol;

in step (e), the isostatic pressure is about 200 MPa;

in step (g), the sintering is at about 1400° C. for about 1 hr;

in step (h), the temperature is about 1000° C. for about 8 hrs;

in step (i), the temperature is about 1200° C. for about 1 hr;

in step (k), the temperature is about 400° C.;

in step (l), the temperature is about 1250° C. and the time is about 1 hr; and in step (m), the temperature is between about 650 and 900° C.

3. The improved fuel cell produced by the method of claim 1.

4. The improved fuel cell produced by the method of claim 2.

5. The improved fuel cell of claim 3 which has a power density of between about 1.2 W/cm$^2$ to 2.0 W/cm$^2$ at about 800° C. and a power density of about 0.5 W/cm$^2$ to 1.0 W/cm$^2$ at about 650° C.

6. The improved fuel cell of claim 4 which has a power density of between about 1.2 W/cm$^2$ to 2.0 W/cm$^2$ at about 800° C. and a power density of about 0.5 W/cm$^2$ to 1.0 W/cm$^2$ at about 650° C.

7. An improved fuel cell produced by the method of claim 1 wherein said fuel cell has a porosity graded anode of at least two different porosities wherein the porosity of the anode layer adjacent to the electrolyte is between about 10 and 30% and a thickness of between about 5 and 100 $\mu$m, and the porosity of the anode layer further from the electrolyte beyond the anode layer adjacent to the electrolyte is between about 20 and 50% and a thickness of between about 100 and 3000 $\mu$m.

8. The improved method of claim 1 wherein in step (d) the alcohol present is selected from the group consisting of methanol, ethanol or propanol.

9. The method of claim 8 wherein in step (j) the organic liquid is selected from the group consisting of C1 to C10 alcohol, C2 to C10 ether, C3 to C10 ketone, C2 to C10 ester or combinations thereof.

10. The improved method of claim 1 wherein

In step (h) LSM comprises a first component (M) of $MnO_2$, a second component (L) selected from the group consisting of $La_2O_3$ and $Y_2O_3$, and a third component of $SrCO_3$.

11. The method of claim 1 wherein, in step (j) the organic liquid is selected from the group consisting of C1 to C10 alcohol, C2 to C10 ether, C3 to C10 ketone, C2 to C10 ester or combinations thereof.

12. The method of claim 1 wherein in step (b) the consolidation is obtained by die-pressing at elevated pressure, tape casting, slip casting, electrophoretic deposition, injection-molding, or combinations of these consolidation procedures.

13. The method of claim 12 wherein the die-pressing occurs at between about 20 and 30 MPa.

14. The method of claim 13 wherein the die pressing occurs at about ambient temperature.

15. The method of claim 1 wherein in step (d) a C1 to C4 alcohol is present, in step (g) the sintering occurs between about 0.5 and 3 hr. and said NiO plus YSZ inner layer has porosity of less than about 10% by volume, and said NiO plus YSZ outer anode and support has a porosity of less than about 10% by volume; and in step (h) the calcining occurs.

16. The method of claim 1 wherein in step (i) the calcining occurs for between about 0.5 and 5 hr;

in step (j) about a 50 weight percent of LSM and 50 weight percent of YSZ are mixed; and in step (k) the heating occurs for between about 0.5 and 5 hr.

17. The method of claim 1 wherein in step (l) the heating occurs for between about 0.5 and 5 hr; and step (m) the ratio of water and hydrogen is between about 1/99 to 10/90 and the time is between about 0.5 and 5 hr.

18. The method of claim 1 wherein in step (m) the thicker anode is between about 70 to 90 volume percent of nickel oxide, and the thinner anode is between about 50 and 65 volume percent of nickel oxide.

19. The improved fuel cell produced by the method of claim 16.

20. The improved fuel cell produced by the method of claim 17.

* * * * *